United States Patent
Yu et al.

(10) Patent No.: US 11,623,659 B2
(45) Date of Patent: Apr. 11, 2023

(54) METHOD FOR CONTROLLING AUTONOMOUS VEHICLE TO PASS THROUGH CURVE, ELECTRONIC DEVICE AND MEDIUM

(71) Applicant: BEIJING BAIDU NETCOM SCIENCE AND TECHNOLOGY CO., LTD., Beijing (CN)

(72) Inventors: Ning Yu, Beijing (CN); Jingjing Xue, Beijing (CN); Dongchun Yao, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 360 days.

(21) Appl. No.: 16/921,008

(22) Filed: Jul. 6, 2020

(65) Prior Publication Data

US 2021/0114620 A1 Apr. 22, 2021

(30) Foreign Application Priority Data

Oct. 18, 2019 (CN) .......................... 201910995131.0

(51) Int. Cl.
*B60W 60/00* (2020.01)
*B60W 30/09* (2012.01)
(Continued)

(52) U.S. Cl.
CPC ........ *B60W 60/0015* (2020.02); *B60W 30/04* (2013.01); *B60W 30/045* (2013.01);
(Continued)

(58) Field of Classification Search
None
See application file for complete search history.

(56) References Cited

U.S. PATENT DOCUMENTS

2008/0059036 A1\* 3/2008 Imai ..................... B60W 30/143
701/93
2016/0207534 A1\* 7/2016 Nishimura .......... B60W 30/095
(Continued)

FOREIGN PATENT DOCUMENTS

CN 102167040 A 8/2011
CN 102795224 A 11/2012
(Continued)

OTHER PUBLICATIONS

Office Action for Chinese Application No. 201910995131.0, dated Jul. 29, 2020, 16 pages.
(Continued)

*Primary Examiner* — Christian Chace
*Assistant Examiner* — Shayne M. Gilbertson
(74) *Attorney, Agent, or Firm* — Lippes Mathias LLP (57) ABSTRACT

Embodiments of the present disclosure disclose a method for controlling an autonomous vehicle to pass through a curve, a device and a medium, and relate to the field of autonomous driving technologies. At least one implementation of the method for controlling an autonomous vehicle to pass through a curve includes: determining a curve boundary within a sensing area in a current driving direction of the autonomous vehicle based on a current position of the autonomous vehicle on the curve; determining a current safe stopping distance of the autonomous vehicle on the curve based on current driving parameters of the autonomous vehicle and the curve boundary; determining a speed threshold of the autonomous vehicle based on the current safe stopping distance, braking parameters of the autonomous vehicle and a curve curvature corresponding to the current position; and controlling a speed of the autonomous vehicle not to exceed the speed threshold.

18 Claims, 5 Drawing Sheets

(51) Int. Cl.
    *B60W 30/095* (2012.01)
    *B60W 40/072* (2012.01)
    *B60W 40/105* (2012.01)
    *B60W 30/045* (2012.01)
    *B60W 30/18* (2012.01)
    *B60W 30/04* (2006.01)

(52) U.S. Cl.
    CPC ........ *B60W 30/09* (2013.01); *B60W 30/0956* (2013.01); *B60W 30/18145* (2013.01); *B60W 40/072* (2013.01); *B60W 40/105* (2013.01); *B60W 60/0027* (2020.02); *B60W 2520/06* (2013.01); *B60W 2520/10* (2013.01); *B60W 2530/20* (2013.01); *B60W 2552/30* (2020.02); *B60W 2554/20* (2020.02); *B60W 2554/402* (2020.02); *B60W 2554/4044* (2020.02); *B60W 2554/80* (2020.02); *B60W 2554/802* (2020.02); *B60W 2556/40* (2020.02); *B60W 2720/10* (2013.01)

(56) References Cited

U.S. PATENT DOCUMENTS

| | | | | |
|---|---|---|---|---|
| 2016/0368534 | A1* | 12/2016 | Harda | B62D 15/025 |
| 2018/0148053 | A1* | 5/2018 | Lee | B60W 30/143 |
| 2018/0196440 | A1* | 7/2018 | Zhu | G05D 1/0223 |
| 2019/0120631 | A1 | 4/2019 | Seo et al. | |
| 2020/0384999 | A1* | 12/2020 | Ohmura | B60W 30/0956 |

FOREIGN PATENT DOCUMENTS

| | | |
|---|---|---|
| CN | 204978641 U | 1/2016 |
| CN | 106004873 A | 10/2016 |
| CN | 106740811 A | 5/2017 |
| CN | 108284833 A | 7/2018 |
| JP | H10338057 A | 12/1998 |
| JP | 2006137263 A | 6/2006 |
| JP | 2011051570 A | 3/2011 |
| JP | 2012040914 A | 3/2012 |
| JP | 2015098233 A | 5/2015 |
| JP | 2016203817 A | 12/2016 |
| JP | 2017146794 A | 8/2017 |
| JP | 2018101400 A | 6/2018 |
| JP | 2019069659 A | 5/2019 |
| JP | 2019172068 A | 10/2019 |
| JP | 2019172113 A | 10/2019 |

OTHER PUBLICATIONS

OA for JP application 2020-171225 (dated Oct. 25, 2022; official posting date Nov. 1, 2022), 3 pages.
English translation of OA for JP application 2020-171225 (dated Oct. 25, 2022; official posting date Nov. 1, 2022), 3 pages.

* cited by examiner

METHOD FOR CONTROLLING AUTONOMOUS VEHICLE TO PASS THROUGH CURVE, ELECTRONIC DEVICE AND MEDIUM

CROSS-REFERENCE TO RELATED APPLICATION

This application claims priority to and benefits of Chinese Patent Application Serial No. 201910995131.0, filed the State Intellectual Property Office of P. R. China on Oct. 18, 2019, the entire content of which is incorporated herein by reference.

FIELD

Embodiments of the present disclosure relate to the field of computer technologies, specifically to the field of autonomous driving technologies, and more particularly, to a method for controlling an autonomous vehicle to pass through a curve, an electronic device and a medium.

BACKGROUND

Curves are high-incidence road section of traffic accidents. The reasonable movement state control of vehicles passing through the curves may ensure that the vehicles smoothly pass through the curves and reduce the occurrence of traffic accidents happening at curves.

SUMMARY

Embodiments of the present disclosure disclose a method for controlling an autonomous vehicle to pass through a curve, including: determining a curve boundary within a sensing area in a current driving direction of the autonomous vehicle based on a current position of the autonomous vehicle on the curve; determining a current safe stopping distance of the autonomous vehicle on the curve based on current driving parameters of the autonomous vehicle and the curve boundary; determining a speed threshold of the autonomous vehicle based on the current safe stopping distance, braking parameters of the autonomous vehicle and a curve curvature corresponding to the current position; and controlling a speed of the autonomous vehicle to be less than or equal to the speed threshold.

Embodiments of the present disclosure further disclose an apparatus for controlling an autonomous vehicle to pass through a curve, including: a curve boundary determination module, configured to determine a curve boundary within a sensing area in a current driving direction of the autonomous vehicle based on a current position of the autonomous vehicle on the curve; a current-safe-stopping-distance determination module, configured to determine a current safe stopping distance of the autonomous vehicle on the curve based on current driving parameters of the autonomous vehicle and the curve boundary; a speed threshold determination module, configured to determine a speed threshold of the autonomous vehicle based on the current safe stopping distance, braking parameters of the autonomous vehicle and a curve curvature corresponding to the current position; and a speed control module, configured to control a speed of the autonomous vehicle to be less than or equal to the speed threshold.

Embodiments of the present disclosure further disclose an electronic device, including: at least one processor; and a memory connected in communication with the at least one processor. The memory stores an instruction executable by the at least one processor, and the instruction is executed by the at least one processor, such that the at least one processor may perform the method for controlling the autonomous vehicle to pass through the curve as described in any embodiment of the present disclosure.

Embodiments of the present disclosure further disclose a non-transitory computer-readable storage medium having a computer instruction stored thereon. The computer instruction is configured to make a computer perform the method for controlling the autonomous vehicle to pass through the curve as described in any embodiment of the present disclosure.

BRIEF DESCRIPTION OF THE DRAWINGS

The drawings are used for a better understanding of this solution, and do not constitute a limitation on the present disclosure.

DETAILED DESCRIPTION

Exemplary embodiments of the present disclosure are described below with reference to the accompanying drawings, which include various details of the embodiments of the present disclosure to facilitate understanding, and should be considered as merely exemplary. Therefore, the skilled in the art should recognize that various changes and modifications may be made to the embodiments described herein without departing from the scope and spirit of the present disclosure. In addition, for clarity and conciseness, descriptions of well-known functions and structures are omitted in the following description.

Figure 1:
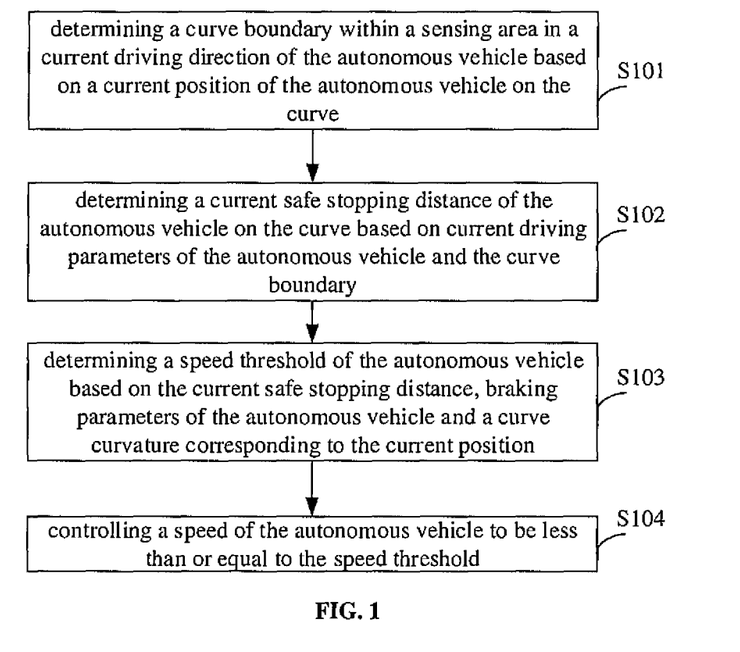
FIG. 1 is a flowchart of a method for controlling an autonomous vehicle to pass through a curve according to an embodiment of the present disclosure.

FIG. 1 is a flowchart of a method for controlling an autonomous vehicle to pass through a curve according to an embodiment of the present disclosure. This embodiment may be applied to a case of reasonably controlling the autonomous vehicle or an unmanned vehicle to pass through the curve when the autonomous vehicle or the unmanned vehicle drives on the curve. The curve section includes a road section with a narrow road width and a small curve angle. The method in this embodiment may be executed by an apparatus for controlling an autonomous vehicle to pass through a curve, which may be implemented in a software and/or hardware manner, and may be integrated in an autonomous vehicle control system or a vehicle-mounted device.

As illustrated in FIG. 1, the method for controlling the autonomous vehicle to pass through the curve according to the embodiment may include the following.

At block S101, a curve boundary within a sensing area in a current driving direction of the autonomous vehicle is determined based on a current position of the autonomous vehicle on the curve.

When the autonomous vehicle is driving on the curve, the sensing area of the autonomous vehicle in the current driving direction may be determined in real time based on the deployment of sensors on the autonomous vehicle. The image recognition technology or map matching technology is used to recognize and extract the environment information within the sensing area to determine the curve boundary in the sensing area. The curve boundary includes an outer boundary and an inner boundary of the curve. In the process of determining the curve boundary based on the sensing area of the autonomous vehicle, the outer and inner boundaries of the curve may be determined at the same time, or a boundary closer to a position of the autonomous vehicle may be determined based on the current position of the autonomous vehicle. For example, when the autonomous vehicle drives on an outer lane of the curve, the outer boundary of the curve may be determined. The determined curve boundary is used to determine the current safe stopping distance of the autonomous vehicle to avoid road accidents caused by the autonomous vehicle driving out of the curve when the autonomous vehicle is in an emergency stop.

Optionally, determining the curve boundary within the sensing area in the current driving direction of the autonomous vehicle based on the current position of the autonomous vehicle on the curve includes: determining, based on the current position of the autonomous vehicle on the curve, map data of the curve by performing position matching on a map; and extracting the curve boundary from the map data of the curve based on a sensing angle corresponding to the sensing area of the autonomous vehicle in the current driving direction.

The map used for position matching includes a high definition map. The map data includes information about each road, including but not limited to road identifiers, road names, lane information contained in a road, and position coordinates of respective points on the road. The positioning device is used to determine the current position of the autonomous vehicle in real time, and the map matching is used to determine the curve on which the autonomous vehicle is currently driving. The map data of the curve is determined from a map database based on an identifier of the curve or a name of the curve. Finally, a series of discrete coordinate points belonging to the road boundary are extracted from the determined map data of the curve based on the sensing angle. The sensing angle is related to the deployment of the sensor on the autonomous vehicle, functional parameters of the sensor, and the curve environment, and may be determined based on the actual situation.

Based on the current position of the autonomous vehicle on the curve, before determining the curve boundary within the sensing area in the current driving direction, the solution of this embodiment may further include determining whether the autonomous vehicle drives on the curve or is about to drive on the curve based on the current position of the autonomous vehicle obtained through the positioning device or a positioning module in the autonomous vehicle in combination with an actual driving task of the autonomous vehicle, such as forward turning, backward turning, automatic U-turn, automatic parking, merging into the traffic flow, or the like. The actual driving task of the autonomous vehicle determines the driving direction of the autonomous vehicle. In detail, whether the road on which the autonomous vehicle currently drives is a curve may be determined based on a curvature changing trend corresponding to trajectory points of the real-time driving of the autonomous vehicle and a changing trend of the boundary of the road. Alternatively, the current position of the autonomous vehicle may be projected onto the map to determine a lane on which the autonomous vehicle drives. Lanes in the map data will be marked with lane types, including straight, left turn, right turn, U-turn, etc. By using the lane types marked on the map, it may be determined whether the autonomous vehicle currently drives on a curve or whether the autonomous vehicle may make a turn after driving for a preset distance. After determining that the autonomous vehicle drives on a curve or is about to enter a curve, the high definition map data may be used to obtain road characteristics of the curve section for future use. The road characteristics include a direction of the curve, a maximum angle of the curve, the curve curvature, a road width, etc.

At block S102, a current safe stopping distance of the autonomous vehicle on the curve is determined based on current driving parameters of the autonomous vehicle and the curve boundary.

The current driving parameters of the autonomous vehicle may include information such as coordinates of the current position and a heading angle of the autonomous vehicle at the current position. The heading angle of the autonomous vehicle refers to an included angle between a center-of-mass velocity of the autonomous vehicle and a horizontal axis in a ground coordinate system, and may be used to characterize the driving direction of the autonomous vehicle at the current position. Through geometric simulation calculation, a shortest distance between the current position of the autonomous vehicle and the curve boundary is determined as the current safe stopping distance of the autonomous vehicle. A safe stopping distance of any position during the driving of the autonomous vehicle on the curve is used to ensure that the autonomous vehicle may not drive out of the curve boundary to cause a road accident due to an excessive speed when making a turn.

At block S103, a speed threshold of the autonomous vehicle is determined based on the current safe stopping distance, braking parameters of the autonomous vehicle and a curve curvature corresponding to the current position.

At block S104, a speed of the autonomous vehicle is controlled to be less than or equal to the speed threshold.

For example, kinematic principles may be used to comprehensively consider the current safe stopping distance of the autonomous vehicle, the braking parameters of the autonomous vehicle, and the curve curvature corresponding to the current position to calculate the speed threshold of the autonomous vehicle at the current position, i.e., an upper speed limit of the autonomous vehicle at the current position. The autonomous vehicle is controlled to pass the current position at a speed not exceeding, i.e., less than or equal to, the speed threshold. As the position of the autonomous vehicle changes during the turn, the speed threshold corresponding to each driving position is determined to achieve reasonable control of the speed of the autonomous vehicle during the turn, which may ensure that the autonomous vehicle successfully passes through the curve, prevent the autonomous vehicle from falling into a curve dead zone and cannot driving normally due to an excessive speed, and avoid a rollover of the autonomous vehicle. In particular, for the curve with a small angle and a narrow road width, if the turning speed is not controlled properly, the autonomous vehicle is very likely to drive into the curve dead zone or turn over. This solution may avoid such a case by calculating the upper limit of the vehicle speed and controlling the vehicle speed in real time during the turn. At the same time, this solution may ensure the safety of the autonomous vehicle when the autonomous vehicle makes an emergency stop on the curve, preventing the autonomous vehicle from driving out of the road boundary caused by an excessive speed when the autonomous vehicle losses control. For different autonomous vehicles, the determined speed threshold is also related to a positioning error of an autonomous vehicle and a control error of an autonomous driving system. These errors are within a controllable range on the basis of ensuring that the autonomous vehicle passes through the curve smoothly.

In addition, it should be noted that during the driving of the autonomous vehicle on the curve, the speed threshold of the autonomous vehicle is calculated in real time to reasonably control the vehicle speed. The driving path of the autonomous vehicle may be changed or maintained, and whether to change or maintain the driving path may be determined based on the actual curve environment. For example, if there is an obstacle on the curve that affect the current driving path of the autonomous vehicle, an avoidance path needs to be re-planned based on information of the obstacle.

With the technical solution of the embodiment of the present disclosure, when determining the upper limit of the turning speed of the autonomous vehicle, the safe stopping distance between the curve boundary in the sensing area along the driving direction and the autonomous vehicle, the braking parameters of the autonomous vehicle, and the curve curvature are considered comprehensively to calculate the upper limit of the vehicle speed and control the vehicle speed in real time based on different driving environments of the curve, which solves the problem of unreasonably controlling the turning speed of the autonomous vehicle in the prior art. Consequently, not only the success rate of the autonomous vehicle in passing through different curves is raised, but also the road safety at the curves is improved, avoiding the risk that the autonomous vehicle cannot be stopped timely and rushes out the curve boundary due to a loss of control of the autonomous vehicle.

Figure 2:
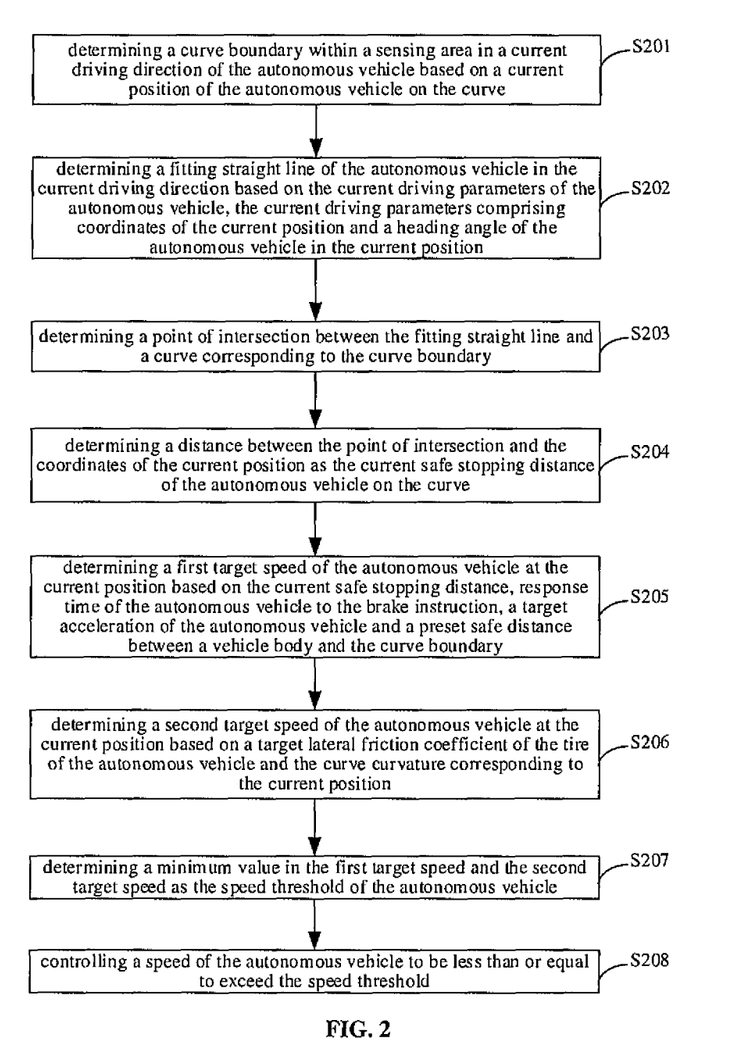
FIG. 2 is a flowchart of a method for controlling an autonomous vehicle to pass through a curve according to another embodiment of the present disclosure.

FIG. 2 is a flowchart of a method for controlling an autonomous vehicle to pass through a curve according to another embodiment of the present disclosure, which is further expanded based on the foregoing embodiment, and may be combined with various optional technical solutions in the foregoing embodiment. As illustrated in FIG. 2, the method may include the following.

At block S201, a curve boundary within a sensing area in a current driving direction of the autonomous vehicle is determined based on a current position of the autonomous vehicle on the curve.

At block S202, a fitting straight line of the autonomous vehicle in the current driving direction is determined based on the current driving parameters of the autonomous vehicle. The current driving parameters include coordinates of the current position and a heading angle of the autonomous vehicle in the current position.

In this embodiment, in the process of controlling the turning speed of the autonomous vehicle, if there is no obstacle to avoid in the driving direction of the autonomous vehicle, the autonomous vehicle may continue to travel according to the driving path determined before the turn, thereby reducing the amount of calculations that the autonomous vehicle needs to perform. In a case where the driving path has been determined in advance, the driving positions of the autonomous vehicle are respective trajectory point on the driving trajectory, i.e., Traj: $\{P_1, P_2, P_3, \ldots, P_n\}$. Assuming that during the turn, information of the current position of the autonomous vehicle is represented as $P_i$ ($X_i$, $Y_i$, $\theta_i$), where ($X_i$, $Y_i$) represents coordinates of the position, and $\theta_i$ represents the heading angle of the autonomous vehicle. A straight line that passes through the point ($X_i$, $Y_i$) and along the direction of the angle $\theta_i$ may be determined. The equation of the straight line may be expressed as $A_iX_i+B_iY_i+C_i=0$, where $A_i$, $B_i$ and $C_i$ represent parameters of the straight line, and may be determined by a simple algebraic calculation.

At block S203, a point of intersection between the fitting straight line and a curve corresponding to the curve boundary is determined.

The curve boundary is also represented by a series of discrete coordinate points. Through curve fitting, a boundary curve may be determined. For example, based on the current position $P_i$ of the autonomous vehicle the discrete coordinate points of the road boundary intercepted in the sensing area of the autonomous vehicle or in a line-of-sight range of the autonomous vehicle and along the current driving direction of the autonomous vehicle are expressed as $R_w$: $\{R_1, R_2, R_3 \ldots, R_n\}$, and then the boundary curve $Y=F(X)$ is obtained by curve fitting. The boundary curve may be as close as possible to a contour of the curve boundary. After that, algebraic calculations are performed on the fitting straight line and the boundary curve to obtain the point of intersection between the fitting straight line and the boundary curve. The point of intersection is a position point where the autonomous vehicle may run out of the curve boundary when the autonomous vehicle is out of control due to an excessive speed when passing the current position.

Optionally, determining the point of intersection between the fitting straight line and the curve corresponding to the curve boundary includes: solving equations corresponding to the fitting straight line and the curve corresponding to the curve boundary jointly to obtain the point of intersection; or traversing each position point in the curve corresponding to the curve boundary to determine a point-line distance between each position point and the fitting straight line, and determining a position point with a point-line distance less than a distance threshold as the point of intersection. The distance threshold may be determined based on a calculation accuracy to select a position point in the curve with the smallest distance from the fitting straight line. When the position points in the curve are dense, that is, a step length between adjacent position points is small, for example, less than 0.1 meters, the point-line distance may be preferably used to determine the point of intersection, thereby saving the operation of curve fitting, and the denseness of the position points in the curve also guarantees the rationality and accuracy on determining the point of intersection.

At block S204, a distance between the point of intersection and the coordinates of the current position is determined as the current safe stopping distance of the autonomous vehicle on the curve.

For example, the distance between the point of intersection and the coordinates of the current position may be obtained by using a distance calculation formula of the coordinate points.

At block S205, a first target speed of the autonomous vehicle at the current position is determined based on the current safe stopping distance, response time of the autonomous vehicle to a brake instruction, a target acceleration of the autonomous vehicle and a preset safe distance between a vehicle body and the curve boundary.

Figure 3:
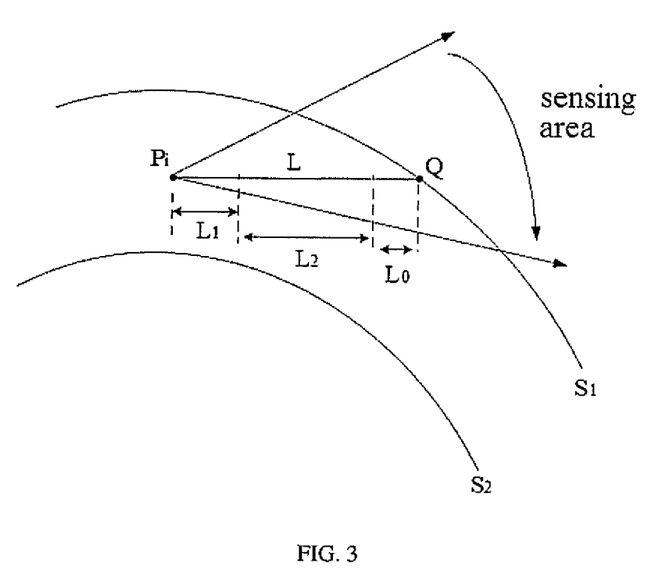
FIG. 3 is a schematic diagram of illustrating a safe stopping distance when an autonomous vehicle passes through a curve according to an embodiment of the present disclosure.

In this embodiment, the braking parameters of the autonomous vehicle include the response time T of the autonomous vehicle to the brake instruction, the target acceleration $a_m$ of the autonomous vehicle, and a target lateral friction coefficient $\mu_m$ of a tire of the autonomous vehicle. The target acceleration $a_m$ may refer to a maximum acceleration supported by the autonomous vehicle, and the target lateral friction coefficient $\mu_m$ of the tire of the autonomous vehicle may refer to a maximum lateral friction coefficient of the tire of the autonomous vehicle. $a_m$, $\mu_m$, and T are known quantities related to the performance of the autonomous vehicle. For example, the first target speed of the autonomous vehicle at the current position is expressed as $V_{max1}$, the current safe stopping distance is expressed as L, and the preset safe distance between the vehicle body and the curve boundary is expressed as $L_0$. Generally, $L_0$ may be taken as 0.5 meters. The following formula may be used to determine the first target speed:

$$V_{max1}T + V_{max1}^2/2a_m + L_0 \leq L,$$

where, $L_1 = V_{max1}T$ represents a distance traveled by the autonomous vehicle from the time when the autonomous vehicle control system receives the brake instruction to the time when the autonomous vehicle control system starts to execute the brake instruction, and $L_2 = V_{max1}^2/2a_m$ represents an emergency braking distance of the autonomous vehicle after the brake instruction is executed. $L_0$, L, T and $a_m$ are all known quantities. By solving the above formula, the first target speed of the autonomous vehicle at the current position may be obtained. FIG. 3, as an example, is a schematic diagram illustrating a safe stopping distance when an autonomous vehicle passes through a curve according to an embodiment of the present disclosure. For example, the safe stopping distance is determined relative to an outer boundary of the curve. As illustrated in FIGS. 3, $S_1$ and $S_2$ respectively represent the outer boundary and an inner boundary of the curve, point $P_i$ represents the current position of the autonomous vehicle, point Q represents the point of intersection between a current fitting straight line and a curve of the curve boundary, and a distance between point $P_i$ and point Q is the current safe stopping distance of the autonomous vehicle. In the process of passing through the curve, if the autonomous vehicle is out of control and stops within the safe stopping distance, the autonomous vehicle may be prevented from driving out of the outer boundary of the curve, thereby ensuring the safety of the autonomous vehicle.

At block S206, a second target speed of the autonomous vehicle at the current position is determined based on the target lateral friction coefficient of the tire of the autonomous vehicle and the curve curvature corresponding to the current position.

In detail, the second target speed $V_{max2}$ of the autonomous vehicle at the current position may be determined using the following formula: $V_{max2} = \sqrt{(g\mu_m/K_i)}$, where $K_i$ represents the curve curvature corresponding to the current position of the autonomous vehicle.

At block S207, a minimum value in the first target speed and the second target speed is determined as the speed threshold of the autonomous vehicle.

That is, an upper limit of the turning speed of the autonomous vehicle at the current position is $V_{max} = \min(V_{max1}, V_{max2})$.

At block S208, a speed of the autonomous vehicle is controlled not to exceed the speed threshold.

With the technical solution of the embodiment of the present disclosure, firstly, straight line fitting is performed along the current driving direction of the autonomous vehicle, and the current safe stopping distance of the autonomous vehicle is determined in combination with the curve of the curve boundary in the current sensing area of the autonomous vehicle. And then, the current safe stopping distance of the autonomous vehicle, the braking parameters of the autonomous vehicle, and the curve curvature at the current position are considered comprehensively to determine the upper limit of the turning speed of the autonomous vehicle at the current position, realizing a reasonable determination of the turning speed threshold, and solving the problem of unreasonably controlling the turning speed of the autonomous vehicle in the prior art. Consequently, not only the success rate of the autonomous vehicle in passing through different curves is raised, but also the road safety at the curve is improved, thereby avoiding the risk that during cornering, the autonomous vehicle rolls over due to a loss of control or rushes out the curve boundary due to failing to be stopped timely.

Figure 4:
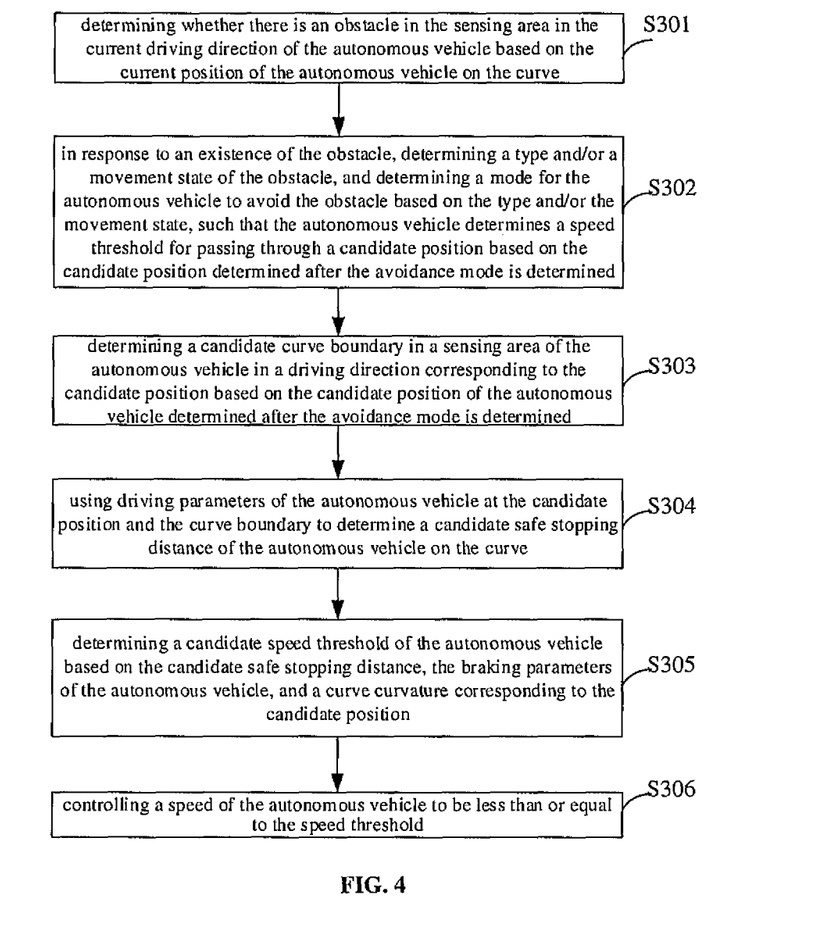
FIG. 4 is a flowchart of a method for controlling an autonomous vehicle to pass through a curve according to yet another embodiment of the present disclosure.

FIG. 4 is a flowchart of a method for controlling an autonomous vehicle to pass through a curve according to yet another embodiment of the present disclosure, which is further expanded based on the foregoing embodiments, and may be combined with various optional technical solutions in the foregoing embodiments. As illustrated in FIG. 4, the method may include the following.

At block S301, it is determined whether there is an obstacle in the sensing area in the current driving direction of the autonomous vehicle based on the current position of the autonomous vehicle on the curve.

The determination of the obstacle may be implemented using any available obstacle recognition technology in the prior art, such as image recognition and detection, and the like, which is not specifically limited in this embodiment. The obstacle in this embodiment refers to any object that has an influence on the normal driving of the autonomous vehicle.

At block S302, in response to an existence of the obstacle, a type and/or a movement state of the obstacle is determined, and a mode for the autonomous vehicle to avoid the obstacle is determined based on the type and/or the movement state, such that the autonomous vehicle determines a speed threshold for passing through a candidate position based on the candidate position determined after the mode for the autonomous vehicle to avoid the obstacle is determined.

Types of obstacles may be distinguished based on properties of the obstacles, such as pedestrians, other vehicles, cones, etc. The movement state is used to indicate a movement trend of the obstacle, and may include the speed, direction and trajectory of the movement of the obstacle. The obstacles may be classified into static obstacles and dynamic obstacles based on the movement states of the obstacles.

When it is determined that there is an obstacle in the driving direction of the autonomous vehicle, the speed of the movement of the obstacle may be determined by using a speed detection method for obstacles in the prior art, and the direction and trajectory of the movement of the obstacle may be predicted by using a prediction algorithm based on a long short-term memory (LSTM) neural network model or a hidden Markov model.

After it is determined that there is the obstacle in the current driving direction of the autonomous vehicle, the current avoidance mode may be determined based on at least one of the type and the state of the movement of the obstacle in accordance with the actual situation. For example, for an obstacle that does not have moving characteristics, the autonomous vehicle may move back for a certain distance and move around to avoid the obstacle. For an obstacle that has moving characteristics, the mode for the autonomous vehicle to avoid the obstacle may be determined by comparing a direction and a trajectory of movement of the obstacle with the current driving direction and a current driving path of the autonomous vehicle. For example, the predicted trajectory of movement of the obstacle may be merged with the current driving path of the autonomous vehicle, such as projecting the trajectory of movement of the obstacle and the current driving path of the autonomous vehicle respectively into a Frenet coordinate system (or a Frenet-Serret formula) for comparative analysis to determine a collision probability between the autonomous vehicle and the obstacle, and then the driving path of the autonomous vehicle is re-planned to avoid the obstacle.

At block S303, a candidate curve boundary in a sensing area of the autonomous vehicle in a driving direction corresponding to the candidate position is determined based on the candidate position of the autonomous vehicle determined after the mode is determined.

After the autonomous vehicle determines the avoidance mode for the obstacle on the curve, the candidate position of the autonomous vehicle may refer to a position of the autonomous vehicle before the avoidance mode is determined, or a new position determined based on the avoidance mode after the avoidance mode is determined. After the avoidance mode is determined, the turning speed of the autonomous vehicle is controlled based on the candidate position of the autonomous vehicle, that is, the candidate position of the autonomous vehicle is equivalent to a new current position.

At block S304, a candidate safe stopping distance of the autonomous vehicle on the curve is determined according to driving parameters of the autonomous vehicle at the candidate position and the curve boundary.

The driving parameters of the autonomous vehicle at the candidate position may include information such as coordinates of the candidate position and a heading angle of the autonomous vehicle at the candidate position.

At block S305, a candidate speed threshold of the autonomous vehicle is determined based on the candidate safe stopping distance, the braking parameters of the autonomous vehicle, and a curve curvature corresponding to the candidate position.

At block S306, the speed of the autonomous vehicle is controlled not to exceed the candidate speed threshold. That is, the autonomous vehicle is controlled to pass the determined candidate position at the speed that does not exceed the candidate speed threshold.

Optionally, if it is determined that there is an obstacle in the sensing area in the current driving direction, the method further includes: obtaining a curve curvature and a curve width corresponding to each position point on a centerline of the curve in the sensing area in the current driving direction, in which the curve curvature and the curve width may be obtained from the map data; determining whether a maximum curvature value in respective curve curvatures is smaller than a curvature threshold and whether a maximum width value in respective curve widths is smaller than a width threshold; and in response to determining that the maximum curvature value is smaller than the curvature threshold and the maximum width value is smaller than the width threshold, determining that the mode for the autonomous vehicle to avoid the obstacle determined based on the type and/or the movement state of the obstacle includes a stop-and-wait avoidance mode and a back-and-detour avoidance mode.

In the sensing area of the autonomous vehicle, if the maximum curvature value of the respective curves is smaller than the curvature threshold and the maximum width value of the respective curve widths is smaller than the width threshold, it means that the curve where the autonomous vehicle is currently in is a special curve with a small turning angle and a narrow road width. If the mode of directly avoiding the obstacle at the driving position in the prior art is adopted, it is likely that the autonomous vehicle may fall into the curve dead zone due to an excessive speed or a large avoidance angle, such that normal driving may be impossible or an avoidance accident may be caused. Consequently, by adopting an avoidance mode related to time-level or position-level avoidance to avoid the obstacle in a special curve, a reasonable avoidance of the obstacle is achieved by the technical solution of the embodiment on the premise of ensuring the safety of passing a narrow curve. The curve curvature threshold and the curve width threshold may be reasonably determined based on a size of the autonomous vehicle and a minimum turning radius of the autonomous vehicle, which are not specifically limited in this embodiment.

In detail, the stop-and-wait avoidance mode means that, based on the type and/or the movement state of the obstacle, the autonomous vehicle stops first, letting the obstacle continue to move for a preset time, and then continues to drive along an existing driving path. The autonomous vehicle calculates the turning speed threshold and controls the driving speed in real time during the driving process, so as to achieve a reasonable avoidance of the obstacle. The preset time may be adaptively determined based on the speed of movement of the obstacle on the premise of avoiding a collision. The back-and-detour avoidance mode means that, based on the type and/or the movement state of the obstacle, the autonomous vehicle retreats a preset distance relative to the current position, and then re-plans the driving path based on constraints of curve driving. The autonomous vehicle calculates the turning speed threshold and controls the driving speed in real time while driving along the new driving path, so as to avoid the obstacle. The preset distance may also be adaptively determined based on road driving safety. Compared with the case where the autonomous vehicle directly bypasses the obstacle, the distance between the autonomous vehicle and the obstacle is increased when the automatic driving vehicle moves backward by the preset distance, and the arc of the trajectory of the autonomous vehicle bypassing the obstacle may be smoothed, thereby ensuring the smoothness of an overall driving path of the autonomous vehicle on the curve. Therefore, the risk of rolling over or driving into the dead zone when the autonomous vehicle avoids the obstacle may be reduced, and the success rate for the autonomous vehicle to pass through the curve with the obstacle is also raised. In addition, a path planning failure which is likely to occur when the autonomous vehicle conducts path planning in a state of directly approaching the obstacle in a narrow road is avoided.

EXAMPLE ONE

In response to determining that the maximum curvature value is smaller than the curvature threshold and the maximum width value is smaller than the width threshold, determining the mode for the autonomous vehicle to avoid the obstacle based on the type and/or the movement state includes followings. In response to the obstacle being a dynamic obstacle, and a direction of movement of the dynamic obstacle being away from the current driving direction of the autonomous vehicle, the autonomous vehicle is controlled to stop at the current position for a preset period. After the preset period, the autonomous vehicle is controlled to pass the current position at a speed that is less than or equal to the speed threshold. For example, the obstacle is a pedestrian. The preset time may be determined based on a walking speed of the pedestrian. Within the preset time, the pedestrian gradually moves away from the current position of the autonomous vehicle. After the preset time ends, a distance between the pedestrian and the autonomous vehicle reaches a safe distance, and there will be no collision accident. Therefore, the autonomous vehicle may continue to travel based on an existing driving path without making a change on the driving path. During the driving process, the speed is reasonably controlled based on the above method, and the autonomous vehicle may safely pass through the curve.

EXAMPLE 2

In response to determining that the maximum curvature value is smaller than the curvature threshold and the maximum width value is smaller than the width threshold, determining the mode for the autonomous vehicle to avoid the obstacle based on the type and/or the movement state includes: in response to the obstacle being a static obstacle, or an included angle between a direction of movement of the obstacle and the current driving direction of the autonomous vehicle being less than an included angle threshold, controlling the autonomous vehicle to move back a preset distance based on the current position, and planning an avoidance path against the obstacle based on a candidate position where the autonomous vehicle is after the autonomous vehicle moves back the preset distance; and determining a candidate curve boundary within a sensing area of the autonomous vehicle in a driving direction corresponding to the candidate position in the avoidance path, and determining, based on the candidate curve boundary, a candidate speed threshold for the autonomous vehicle to pass the candidate position.

The included angle between the direction of movement of the obstacle and the current driving direction of the autonomous vehicle being less than the included angle threshold means that there is a risk of collision between the autonomous vehicle and the moving obstacle. The included angle threshold may be determined based on a statistical analysis of the collision risk. When the included angle between the direction of movement of the obstacle and the current driving direction of the autonomous vehicle is greater than or equal to the angle threshold, it is considered that there is no risk of collision between the moving obstacle and the autonomous vehicle, and thus the autonomous vehicle does not need to avoid the obstacle. During the process of re-planning the path based on the candidate position, the autonomous vehicle may also calculate the turning speed threshold at the candidate position. As the position of the autonomous vehicle changes, the autonomous vehicle calculates the speed threshold and controls the speed in real time to achieve an effect of avoiding the obstacle successfully and smoothly passing through the curve.

In addition, even when there is no obstacle, if the autonomous vehicle is stuck on the curve during driving, the autonomous vehicle may re-plan the driving path by retreating a certain distance, thereby improving the success rate of passing through the curve section.

With the technical solution of the embodiment of the present disclosure, when driving on the curve that has the obstacle, the autonomous vehicle may determine the mode to avoid the obstacle based on the type or the movement state of the obstacle, such that the autonomous vehicle determines the speed threshold of passing the candidate position based on the candidate position determined after the avoidance mode is determined. On the basis of ensuring the safety of the autonomous vehicle driving on the curve and reasonably avoiding the obstacle, the success rate for the autonomous vehicle to pass through the curve is raised, and the driving safety at the curve is ensured, thereby avoiding a situation that the autonomous vehicle driving on the curve rolls over or enters the dead zone of the curve due to avoiding the obstacle.

Figure 5:
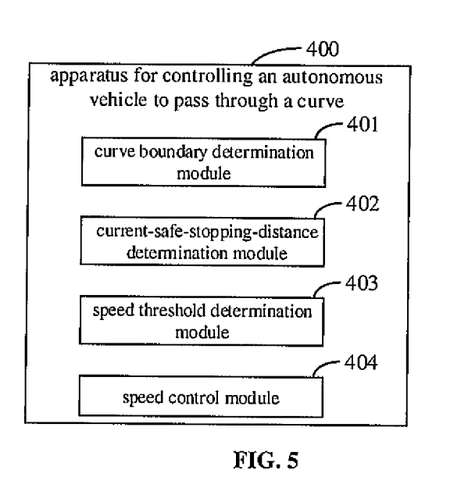
FIG. 5 is a block diagram of an apparatus for controlling an autonomous vehicle to pass through a curve according to an embodiment of the present disclosure.

FIG. 5 is a schematic diagram of an apparatus for controlling an autonomous vehicle to pass through a curve according to an embodiment of the present disclosure. This embodiment may be applied to a case of reasonably controlling the autonomous vehicle or an unmanned vehicle to pass through the curve when the autonomous vehicle or the unmanned vehicle drives on the curve. The curve section includes a road section with a narrow road width and a small curve angle. The apparatus may be implemented in a software and/or hardware manner, and may be integrated in a vehicle control system or a vehicle-mounted device.

As illustrated in FIG. 5, an apparatus 400 for controlling an autonomous vehicle to pass through a curve according to the embodiment of the present disclosure includes a curve boundary determination module 401, a current-safe-stopping-distance determination module 402, a speed threshold determination module 403, and a speed control module 404.

The curve boundary determination module 401 is configured to determine a curve boundary within a sensing area in a current driving direction of the autonomous vehicle based on a current position of the autonomous vehicle on the curve.

The current-safe-stopping-distance determination module 402 is configured to determine a current safe stopping distance of the autonomous vehicle on the curve based on current driving parameters of the autonomous vehicle and the curve boundary.

The speed threshold determination module 403 is configured to determine a speed threshold of the autonomous vehicle based on the current safe stopping distance, braking parameters of the autonomous vehicle and a curve curvature corresponding to the current position.

The speed control module 404 is configured to control a speed of the autonomous vehicle not to exceed the speed threshold.

An embodiment of the present disclosure has the following advantages or beneficial effects. By comprehensively considering the safe stopping distance, the braking parameters, and the curve curvature of the autonomous vehicle driving on the curve, a turning speed threshold of the autonomous vehicle is determined in real time and the turning speed is controlled in real time during the process of position change of the autonomous vehicle, which solves the problem of unreasonably controlling the turning speed of the autonomous vehicle in the prior art. Consequently, not only the success rate for the autonomous vehicle to pass through different curves is raised, but also the road safety at the curves is improved, avoiding the risk that the autonomous vehicle cannot be stopped timely and rushes out the curve boundary due to a loss of control of the autonomous vehicle during the turn.

Optionally, the curve boundary determination module 401 includes a map data determination unit and a curve boundary extraction unit.

The map data determination unit is configured to determine, based on the current position of the autonomous vehicle on the curve, map data of the curve by performing position matching on a map.

The curve boundary extraction unit is configured to extract the curve boundary from the map data of the curve by using a sensing angle corresponding to the sensing area in the current driving direction of the autonomous vehicle.

Optionally, the current-safe-stopping-distance determination module 402 includes a straight line fitting unit, a point of intersection determination unit, and a current-safe-stopping-distance determination unit.

The straight line fitting unit is configured to determine a fitting straight line of the autonomous vehicle in the current driving direction by using the current driving parameters of the autonomous vehicle. The current driving parameters include coordinates of the current position and a heading angle of the autonomous vehicle in the current position.

The point of intersection determination unit is configured to determine a point of intersection between the fitting straight line and a curve corresponding to the curve boundary.

The current-safe-stopping-distance determination unit is configured to determine a distance between the point of intersection and the coordinates of the current position as the current safe stopping distance of the autonomous vehicle on the curve.

Optionally, the point of intersection determination unit is configured to solve equations corresponding to the fitting straight line and the curve corresponding to the curve boundary jointly to obtain the point of intersection; or to traverse each position point in the curve corresponding to the curve boundary to determine a point-line distance between each position point and the fitting straight line, and to determine a position point with a point-line distance less than a distance threshold as the point of intersection.

Optionally, the braking parameters of the autonomous vehicle include response time of the autonomous vehicle to a brake instruction, a target acceleration of the autonomous vehicle, and a target lateral friction coefficient of a tire of the autonomous vehicle. Correspondingly, the speed threshold determination module 403 includes a first target speed determination unit, a second target speed determination unit, and a speed threshold determination unit.

The first target speed determination unit is configured to determine a first target speed of the autonomous vehicle at the current position based on the current safe stopping distance, the response time of the autonomous vehicle to the brake instruction, the target acceleration of the autonomous vehicle and a preset safe distance between a vehicle body and the curve boundary.

The second target speed determination unit is configured to determine a second target speed of the autonomous vehicle at the current position based on the target lateral friction coefficient of the tire of the autonomous vehicle and the curve curvature corresponding to the current position.

The speed threshold determination unit is configured to determine a minimum value in the first target speed and the second target speed as the speed threshold of the autonomous vehicle.

An embodiment of the present disclosure has following advantages or beneficial effects. By determining the minimum value of the first target speed and the second target speed calculated in real time during the driving of the autonomous vehicle as the speed threshold of the autonomous vehicle, it avoids the risk that the autonomous vehicle rolls over due to a loss of control or rushes out the curve boundary due to failing to be stopped timely during the turn, thereby improving the road safety at the curves.

Optionally, the apparatus further includes an obstacle determination module and an avoidance mode determination module.

The obstacle determination module is configured to determine whether there is an obstacle in the sensing area in the current driving direction of the autonomous vehicle based on the current position of the autonomous vehicle on the curve before the curve boundary determination module 401 performs the operation of determining the curve boundary within the sensing area in the current driving direction of the autonomous vehicle based on the current position of the autonomous vehicle on the curve.

The avoidance mode determination module is configured to, in response to an existence of the obstacle, determine a type and/or a movement state of the obstacle, and determine a mode for the autonomous vehicle to avoid the obstacle based on the type and/or the movement state, such that the autonomous vehicle determines a speed threshold for passing through a candidate position based on the candidate position determined after the mode is determined.

An embodiment of the present disclosure has following advantages or beneficial effects. By reasonably choosing the mode for the autonomous vehicle to avoid the obstacle, on the basis of ensuring that the autonomous vehicle running on the curves safely avoids the obstacle, the success rate for the autonomous vehicle to pass through the curves is raised, and the driving safety at the curves is ensured.

Optionally, in response to the existence of the obstacle, the avoidance mode determination module includes a curve curvature and curve width obtaining unit, a threshold comparison unit, and an avoidance mode determination unit.

The curve curvature and curve width obtaining unit is configured to obtain a curve curvature and a curve width corresponding to each position point on a centerline of the curve in the sensing area in the current driving direction.

The threshold comparison unit is configured to determine whether a maximum curvature value in respective curve curvatures is smaller than a curvature threshold and whether a maximum width value in respective curve widths is smaller than a width threshold.

The avoidance mode determination unit is configured to determine that the mode for the autonomous vehicle to avoid the obstacle determined based on the type and/or the movement state includes a stop-and-wait avoidance mode and a back-and-detour avoidance mode in response to determining that the maximum curvature value is smaller than the curvature threshold and the maximum width value is smaller than the width threshold.

An embodiment of the present disclosure has the following advantages or beneficial effects. By adopting an avoidance mode related to time-level or position-level avoidance to avoid the obstacle in a special curve, a reasonable avoidance of the obstacle is achieved on the premise of ensuring the safety of passing a narrow curve.

Optionally, in response to determining that the maximum curvature value is smaller than the curvature threshold and the maximum width value is smaller than the width threshold, the avoidance mode determination unit includes a stop-and-wait avoidance subunit.

The stop-and-wait avoidance subunit is configured to, in response to the obstacle being a dynamic obstacle, and a direction of movement of the dynamic obstacle being away from the current driving direction of the autonomous vehicle, control the autonomous vehicle to stop at the current position for a preset period, and after the preset period, control the autonomous vehicle to pass the current position at a speed that is less than or equal to the speed threshold.

An embodiment of the present disclosure has the following advantages or beneficial effects. Reasonable avoidance of the obstacle is achieved, and no new path planning is required.

Optionally, in response to determining that the maximum curvature value is smaller than the curvature threshold and the maximum width value is smaller than the width threshold, the avoidance mode determination unit includes an avoidance path planning subunit and a candidate speed threshold determination subunit.

The avoidance path planning subunit is configured to, in response to the obstacle being a static obstacle, or an included angle between a direction of movement of the obstacle and the current driving direction of the autonomous vehicle being less than an included angle threshold, control the autonomous vehicle to move back a preset distance based on the current position, and plan an avoidance path against the obstacle based on a candidate position located by the autonomous vehicle after the autonomous vehicle moves back the preset distance.

The candidate speed threshold determination subunit is configured to determine a candidate curve boundary within a sensing area of the autonomous vehicle in a driving direction corresponding to the candidate position in the avoidance path, and to determine a candidate speed threshold for the autonomous vehicle to pass the candidate position based on the candidate curve boundary.

An embodiment of the present disclosure has the following advantages or beneficial effects. As the distance between the autonomous vehicle and the obstacle is increased, a trajectory arc of the autonomous vehicle detouring around the obstacle may be gradually smoothed, which ensures the smoothness of the overall driving path of the autonomous vehicle on the curve, reduces the risk of the autonomous vehicle rolling over or falling into a steering dead zone during obstacle avoidance, and avoids a path planning failure which is likely to occur when the autonomous vehicle in a narrow road plans a path in a state of directly approaching the obstacle.

The apparatus 400 for controlling the autonomous vehicle to pass through the curve according to the embodiment of the present disclosure may implement the method for controlling the autonomous vehicle to pass through the curve according to any embodiment of the present disclosure, and has corresponding function modules and beneficial effects for implementing the method. For content that is not described in detail in this embodiment, reference may be made to the description in any method embodiment of the present disclosure.

According to the embodiments of the present disclosure, the present disclosure further provides an electronic device and a readable storage medium.

Figure 6:
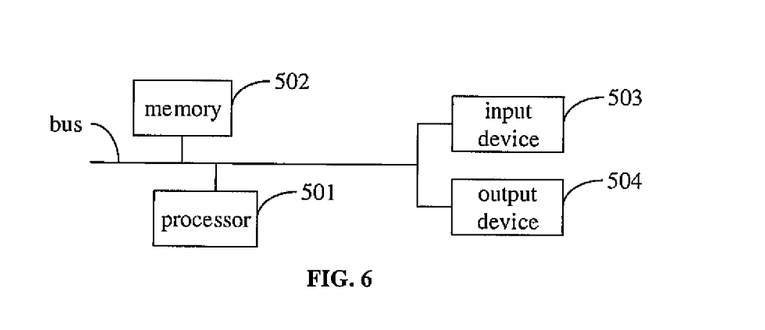
FIG. 6 is a schematic diagram of an electronic device according to an embodiment of the present disclosure.

FIG. 6 is a block diagram of an electronic device for implementing the method for controlling the autonomous vehicle to pass through the curve according to the embodiments of the present disclosure. The electronic device is intended to represent various forms of digital computers, such as a laptop computer, a desktop computer, a workbench, a personal digital assistant, a server, a blade server, a mainframe computer and other suitable computers. The electronic device may represent any vehicle-mounted device, and may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As illustrated in FIG. 6, the electronic device includes: one or more processors 501, a memory 502, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI (Graphical User Interface) on an external input/output device (such as a display device coupled to the interface). In other embodiments, when necessary, multiple processors and/or multiple buses may be used with multiple memories. Similarly, multiple electronic devices may be connected, each providing some of the necessary operations, for example, as a server array, a group of blade servers, or a multiprocessor system. One processor 501 is taken as an example in FIG. 6.

The memory 502 is a non-transitory computer-readable storage medium according to the embodiments of the present disclosure. The memory stores instructions executable by at least one processor, so that the at least one processor executes the method for controlling the autonomous vehicle to pass through the curve according to the embodiments of the present disclosure. The non-transitory computer-readable storage medium according to the present disclosure stores computer instructions, which are configured to make the computer execute the method for controlling the autonomous vehicle to pass through the curve according to the embodiments of the present disclosure.

As a non-transitory computer-readable storage medium, the memory 502 may be configured to store non-transitory software programs, non-transitory computer executable programs and modules, such as program instructions/modules (for example, the curve boundary determination module 401, the current-safe-stopping-distance determination module 402, the speed threshold determination module 403, and the speed control module 404 illustrated in FIG. 4) corresponding to the method for controlling the autonomous vehicle to pass through the curve according to the embodiments of the present disclosure. The processor 501 executes various functional applications and performs data processing of the server by running non-transitory software programs, instructions and modules stored in the memory 502, that is, the method for controlling the autonomous vehicle to pass through the curve according to the foregoing method embodiments is implemented.

The memory 502 may include a storage program area and a storage data area, where the storage program area may store an operating system and applications required for at least one function; and the storage data area may store data created according to the use of the electronic device that implements the method for controlling the autonomous vehicle to pass through the curve according to the embodiments of the present disclosure, and the like. In addition, the memory 502 may include a high-speed random access memory, and may further include a non-transitory memory, such as at least one magnetic disk memory, a flash memory device, or other non-transitory solid-state memories. In some embodiments, the memory 502 may optionally include memories remotely disposed with respect to the processor 501, and these remote memories may be connected to the electronic device, which is configured to implement the method for controlling the autonomous vehicle to pass through the curve according to the embodiments of the present disclosure, through a network. Examples of the network include, but are not limited to, the Internet, an intranet, a local area network, a mobile communication network, and combinations thereof.

The electronic device configured to implement the method for controlling the autonomous vehicle to pass through the curve according to the embodiments of the present disclosure may further include an input device 503 and an output device 504. The processor 501, the memory 502, the input device 503 and the output device 504 may be connected through a bus or in other manners. FIG. 6 is illustrated by establishing the connection through a bus.

The input device 503 may receive, input numeric or character information, and generate key signal inputs related to user settings and function control of the electronic device configured to implement the method for controlling the autonomous vehicle to pass through the curve according to the embodiments of the present disclosure, such as a touch screen, a keypad, a mouse, a trackpad, a touchpad, a pointing stick, one or more mouse buttons, trackballs, joysticks and other input devices. The output device 504 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

With the technical solutions according to embodiments of the present disclosure, by comprehensively considering the safe stopping distance between the curve boundary in the sensing area along the driving direction and the autonomous vehicle, the braking parameters of the autonomous vehicle, and the curve curvature when determining an upper limit of a turning speed threshold of the autonomous vehicle, real-time upper speed limit calculation and speed control are performed based on driving environments of different curves, which solves the problem of unreasonably controlling the turning speed of the autonomous vehicle in the prior art. Consequently, not only the success rate for the autonomous vehicle to pass through different curves is raised, but also the road safety at the curves is improved, thereby avoiding the risk that during cornering, the autonomous vehicle rolls over due to a loss of control or rushes out the curve boundary due to failing to be stopped timely. In addition, the mode for the autonomous vehicle to avoid the obstacle is determined according to the type and/or the movement state of the obstacle, a reasonable avoidance of the obstacle in the curve is realized.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for controlling an autonomous vehicle to pass through a curve, comprising:
   determining a curve boundary within a sensing area in a current driving direction of the autonomous vehicle based on a current position of the autonomous vehicle on the curve;
   determining a current safe stopping distance of the autonomous vehicle on the curve based on current driving parameters of the autonomous vehicle and the curve boundary;
   determining a speed threshold of the autonomous vehicle based on the current safe stopping distance, braking parameters of the autonomous vehicle and a curve curvature corresponding to the current position; and
   controlling a speed of the autonomous vehicle to be less than or equal to the speed threshold;
   wherein the braking parameters of the autonomous vehicle comprise response time of the autonomous vehicle to a brake instruction, a target acceleration of the autonomous vehicle, and a target lateral friction coefficient of a tire of the autonomous vehicle; and
   determining the speed threshold of the autonomous vehicle based on the current safe stopping distance, the braking parameters of the autonomous vehicle and the curve curvature corresponding to the current position comprises:
   determining a first target speed of the autonomous vehicle at the current position based on the current safe stopping distance, the response time of the autonomous vehicle to the brake instruction, the target acceleration of the autonomous vehicle and a preset safe distance between a vehicle body and the curve boundary;
   determining a second target speed of the autonomous vehicle at the current position based on the target lateral friction coefficient of the tire of the autonomous vehicle and the curve curvature corresponding to the current position; and
   determining a minimum value in the first target speed and the second target speed as the speed threshold of the autonomous vehicle.

2. The method of claim 1, wherein determining the curve boundary within the sensing area in the current driving direction of the autonomous vehicle based on the current position of the autonomous vehicle on the curve comprises:
   determining, based on the current position of the autonomous vehicle on the curve, map data of the curve by performing position matching on a map; and
   extracting the curve boundary from the map data of the curve based on a sensing angle corresponding to the sensing area in the current driving direction of the autonomous vehicle.

3. The method of claim 1, wherein determining the current safe stopping distance of the autonomous vehicle on the curve based on the current driving parameters of the autonomous vehicle and the curve boundary comprises:
   determining a fitting straight line of the autonomous vehicle in the current driving direction based on the current driving parameters of the autonomous vehicle, the current driving parameters comprising coordinates of the current position and a heading angle of the autonomous vehicle in the current position;
   determining a point of intersection between the fitting straight line and a curve corresponding to the curve boundary; and
   determining a distance between the point of intersection and the coordinates of the current position as the current safe stopping distance of the autonomous vehicle on the curve.

4. The method of claim 3, wherein determining the point of intersection between the fitting straight line and the curve corresponding to the curve boundary comprises:
   solving equations corresponding to the fitting straight line and the curve corresponding to the curve boundary jointly to obtain the point of intersection; or
   traversing each position point in the curve corresponding to the curve boundary to determine a point-line distance between each position point and the fitting straight line, and determining a position point with a point-line distance less than a distance threshold as the point of intersection.

5. The method of claim 1, before determining the curve boundary within the sensing area in the current driving direction of the autonomous vehicle based on the current position of the autonomous vehicle on the curve, further comprising:
   determining whether an obstacle exists in the sensing area in the current driving direction of the autonomous vehicle based on the current position of the autonomous vehicle on the curve; and
   in response to an existence of the obstacle, determining a type and/or a movement state of the obstacle, and determining a mode for the autonomous vehicle to avoid the obstacle based on the type and/or the movement state, such that the autonomous vehicle determines a speed threshold for passing through a candidate position based on the candidate position determined after the mode is determined.

6. The method of claim 5, in response to the existence of the obstacle, further comprising:
   obtaining a curve curvature and a curve width corresponding to each position point on a centerline of the curve in the sensing area in the current driving direction;
   determining whether a maximum curvature value in respective curve curvatures is smaller than a curvature threshold and whether a maximum width value in respective curve widths is smaller than a width threshold; and
   in response to determining that the maximum curvature value is smaller than the curvature threshold and the maximum width value is smaller than the width threshold, determining that the mode for the autonomous vehicle to avoid the obstacle determined based on the type and/or the movement state comprises a stop-and-wait avoidance mode and a back-and-detour avoidance mode.

7. The method of claim 6, wherein, in response to determining that the maximum curvature value is smaller than the curvature threshold and the maximum width value is smaller than the width threshold, determining the mode for the autonomous vehicle to avoid the obstacle based on the type and/or the movement state comprises:
   in response to the obstacle being a dynamic obstacle, and a direction of movement of the dynamic obstacle being away from the current driving direction of the autonomous vehicle, controlling the autonomous vehicle to stop at the current position for a preset period, and after the preset period, controlling the autonomous vehicle to pass the current position at a speed less than or equal to the speed threshold.

8. The method of claim 6, wherein, in response to determining that the maximum curvature value is smaller than the curvature threshold and the maximum width value is smaller than the width threshold 4, determining the mode for the autonomous vehicle to avoid the obstacle based on the type and/or the movement state comprises:
  in response to the obstacle being a static obstacle, or an included angle between a direction of movement of the obstacle and the current driving direction of the autonomous vehicle being less than an included angle threshold, controlling the autonomous vehicle to move back a preset distance based on the current position, and planning an avoidance path against the obstacle based on a candidate position located by the autonomous vehicle after the autonomous vehicle moves back the preset distance; and
  determining a candidate curve boundary within a sensing area of the autonomous vehicle in a driving direction corresponding to the candidate position in the avoidance path, and determining a candidate speed threshold for the autonomous vehicle to pass the candidate position based on the candidate curve boundary.

9. An electronic device, comprising:
  at least one processor; and
  a memory connected in communication with the at least one processor; wherein,
  the memory stores an instruction executable by the at least one processor, and the instruction is executed by the at least one processor, such that the at least one processor performs a method for controlling an autonomous vehicle to pass through a curve, the method comprising:
  determining a curve boundary within a sensing area in a current driving direction of the autonomous vehicle based on a current position of the autonomous vehicle on the curve;
  determining a current safe stopping distance of the autonomous vehicle on the curve based on current driving parameters of the autonomous vehicle and the curve boundary;
  determining a speed threshold of the autonomous vehicle based on the current safe stopping distance, braking parameters of the autonomous vehicle and a curve curvature corresponding to the current position; and
  controlling a speed of the autonomous vehicle to be less than or equal to the speed threshold;
  wherein the braking parameters of the autonomous vehicle comprise response time of the autonomous vehicle to a brake instruction, a target acceleration of the autonomous vehicle, and a target lateral friction coefficient of a tire of the autonomous vehicle; and
  determining the speed threshold of the autonomous vehicle based on the current safe stopping distance, the braking parameters of the autonomous vehicle and the curve curvature corresponding to the current position comprises:
  determining a first target speed of the autonomous vehicle at the current position based on the current safe stopping distance, the response time of the autonomous vehicle to the brake instruction, the target acceleration of the autonomous vehicle and a preset safe distance between a vehicle body and the curve boundary;
  determining a second target speed of the autonomous vehicle at the current position based on the target lateral friction coefficient of the tire of the autonomous vehicle and the curve curvature corresponding to the current position; and
  determining a minimum value in the first target speed and the second target speed as the speed threshold of the autonomous vehicle.

10. The electronic device of claim 9, wherein determining the curve boundary within the sensing area in the current driving direction of the autonomous vehicle based on the current position of the autonomous vehicle on the curve comprises:
  determining, based on the current position of the autonomous vehicle on the curve, map data of the curve by performing position matching on a map; and
  extracting the curve boundary from the map data of the curve based on a sensing angle corresponding to the sensing area in the current driving direction of the autonomous vehicle.

11. The electronic device of claim 9, wherein determining the current safe stopping distance of the autonomous vehicle on the curve based on the current driving parameters of the autonomous vehicle and the curve boundary comprises:
  determining a fitting straight line of the autonomous vehicle in the current driving direction based on the current driving parameters of the autonomous vehicle, the current driving parameters comprising coordinates of the current position and a heading angle of the autonomous vehicle in the current position;
  determining a point of intersection between the fitting straight line and a curve corresponding to the curve boundary; and
  determining a distance between the point of intersection and the coordinates of the current position as the current safe stopping distance of the autonomous vehicle on the curve.

12. The electronic device of claim 11, wherein determining the point of intersection between the fitting straight line and the curve corresponding to the curve boundary comprises:
  solving equations corresponding to the fitting straight line and the curve corresponding to the curve boundary jointly to obtain the point of intersection; or
  traversing each position point in the curve corresponding to the curve boundary to determine a point-line distance between each position point and the fitting straight line, and determining a position point with a point-line distance less than a distance threshold as the point of intersection.

13. The electronic device of claim 9, wherein, before determining the curve boundary within the sensing area in the current driving direction of the autonomous vehicle based on the current position of the autonomous vehicle on the curve, the method further comprises:
  determining whether an obstacle exists in the sensing area in the current driving direction of the autonomous vehicle based on the current position of the autonomous vehicle on the curve; and
  in response to an existence of the obstacle, determining a type and/or a movement state of the obstacle, and determining a mode for the autonomous vehicle to avoid the obstacle based on the type and/or the movement state, such that the autonomous vehicle determines a speed threshold for passing through a candidate position based on the candidate position determined after the mode is determined.

14. The electronic device of claim 13, wherein, in response to the existence of the obstacle, the method further comprises:
- obtaining a curve curvature and a curve width corresponding to each position point on a centerline of the curve in the sensing area in the current driving direction;
- determining whether a maximum curvature value in respective curve curvatures is smaller than a curvature threshold and whether a maximum width value in respective curve widths is smaller than a width threshold; and
- in response to determining that the maximum curvature value is smaller than the curvature threshold and the maximum width value is smaller than the width threshold, determining that the mode for the autonomous vehicle to avoid the obstacle determined based on the type and/or the movement state comprises a stop-and-wait avoidance mode and a back-and-detour avoidance mode.

15. The electronic device of claim 14, wherein, in response to determining that the maximum curvature value is smaller than the curvature threshold and the maximum width value is smaller than the width threshold, determining the mode for the autonomous vehicle to avoid the obstacle based on the type and/or the movement state comprises:
- in response to the obstacle being a dynamic obstacle, and a direction of movement of the dynamic obstacle being away from the current driving direction of the autonomous vehicle, controlling the autonomous vehicle to stop at the current position for a preset period, and after the preset period, controlling the autonomous vehicle to pass the current position at a speed less than or equal to the speed threshold.

16. The electronic device of claim 15, wherein, in response to determining that the maximum curvature value is smaller than the curvature threshold and the maximum width value is smaller than the width threshold4, determining the mode for the autonomous vehicle to avoid the obstacle based on the type and/or the movement state comprises:
- in response to the obstacle being a static obstacle, or an included angle between a direction of movement of the obstacle and the current driving direction of the autonomous vehicle being less than an included angle threshold, controlling the autonomous vehicle to move back a preset distance based on the current position, and planning an avoidance path against the obstacle based on a candidate position located by the autonomous vehicle after the autonomous vehicle moves back the preset distance; and
- determining a candidate curve boundary within a sensing area of the autonomous vehicle in a driving direction corresponding to the candidate position in the avoidance path, and determining a candidate speed threshold for the autonomous vehicle to pass the candidate position based on the candidate curve boundary.

17. A non-transitory computer-readable storage medium having a computer instruction stored thereon, wherein the computer instruction is configured to make a computer perform a method for controlling an autonomous vehicle to pass through a curve, the method comprising:
- determining a curve boundary within a sensing area in a current driving direction of the autonomous vehicle based on a current position of the autonomous vehicle on the curve;
- determining a current safe stopping distance of the autonomous vehicle on the curve based on current driving parameters of the autonomous vehicle and the curve boundary;
- determining a speed threshold of the autonomous vehicle based on the current safe stopping distance, braking parameters of the autonomous vehicle and a curve curvature corresponding to the current position; and
- controlling a speed of the autonomous vehicle to be less than or equal to the speed threshold;
- wherein the braking parameters of the autonomous vehicle comprise response time of the autonomous vehicle to a brake instruction, a target acceleration of the autonomous vehicle, and a target lateral friction coefficient of a tire of the autonomous vehicle; and
- determining the speed threshold of the autonomous vehicle based on the current safe stopping distance, the braking parameters of the autonomous vehicle and the curve curvature corresponding to the current position comprises:
- determining a first target speed of the autonomous vehicle at the current position based on the current safe stopping distance, the response time of the autonomous vehicle to the brake instruction, the target acceleration of the autonomous vehicle and a preset safe distance between a vehicle body and the curve boundary;
- determining a second target speed of the autonomous vehicle at the current position based on the target lateral friction coefficient of the tire of the autonomous vehicle and the curve curvature corresponding to the current position; and
- determining a minimum value in the first target speed and the second target speed as the speed threshold of the autonomous vehicle.

18. The storage medium of claim 17, wherein determining the curve boundary within the sensing area in the current driving direction of the autonomous vehicle based on the current position of the autonomous vehicle on the curve comprises:
- determining, based on the current position of the autonomous vehicle on the curve, map data of the curve by performing position matching on a map; and
- extracting the curve boundary from the map data of the curve based on a sensing angle corresponding to the sensing area in the current driving direction of the autonomous vehicle.

* * * * *